(12) United States Patent
Li et al.

(10) Patent No.: US 8,212,440 B2
(45) Date of Patent: Jul. 3, 2012

(54) ROTATION STRUCTURE

(75) Inventors: Xiong Li, Shenzhen (CN); Kim-Yeung Sip, Shenzhen (CN)

(73) Assignees: Hong Fu Precision Industry (ShenZhen) Co., Ltd., Shenzhen, Guangdong Province (CN); Hon Hai Precision Industry Co., Ltd., Tu-Chen, New Taipei (TW)

( * ) Notice: Subject to any disclaimer, the term of this patent is extended or adjusted under 35 U.S.C. 154(b) by 528 days.

(21) Appl. No.: 12/507,029

(22) Filed: Jul. 21, 2009

(65) Prior Publication Data

US 2010/0231063 A1 Sep. 16, 2010

(30) Foreign Application Priority Data

Mar. 13, 2009 (CN) .......................... 2009 1 0300839

(51) Int. Cl.
 *H02K 37/08* (2006.01)
 *H02K 37/10* (2006.01)
 *H02K 37/00* (2006.01)
 *H02K 7/00* (2006.01)

(52) U.S. Cl. .................. 310/67 R; 310/49.22; 310/115; 310/90; 310/268

(58) Field of Classification Search ................ 310/67 R, 310/49.22, 115, 90, 268, 49.01, 49.02, 49.05, 310/49.32, 49.53, 49.54, 49.55, 116, 117, 118, 119, 120, 121, 122, 123, 124; 379/433.01, 433.06, 433.13; 455/575.3, 550.1; *H02K 7/00, 37/00, 37/08, 37/10*

See application file for complete search history.

(56) References Cited

U.S. PATENT DOCUMENTS

| 4,107,559 | A | * | 8/1978 | Patel ........................ 310/40 MM |
| 5,471,104 | A | * | 11/1995 | Toshimitsu et al. ............. 310/90 |
| 5,485,517 | A | * | 1/1996 | Gray ......................... 379/433.13 |
| 2004/0202316 | A1 | * | 10/2004 | Abe et al. ...................... 379/451 |
| 2004/0259609 | A1 | * | 12/2004 | Fujii et al. .................. 455/575.3 |
| 2006/0019726 | A1 | * | 1/2006 | Park et al. ................... 455/575.1 |
| 2007/0032263 | A1 | * | 2/2007 | Fujii et al. ................... 455/550.1 |

FOREIGN PATENT DOCUMENTS

| CN | 1540959 | 10/2004 |
| CN | 101280646 | 10/2008 |

* cited by examiner

*Primary Examiner* — Quyen Leung
*Assistant Examiner* — Michael Andrews
(74) *Attorney, Agent, or Firm* — Altis Law Group, Inc.

(57) ABSTRACT

A rotation structure rotates a rotatable segment via the attraction between a number of electromagnetic elements disposed on another rotatable segment around a screw and a magnet disposed on another rotatable segment. The rotated angle of the rotatable segment can be controlled by selectably magnetizing the electromagnetic elements in response to an instruction generated by pressing a button formed on another rotatable segment.

7 Claims, 3 Drawing Sheets

ROTATION STRUCTURE

BACKGROUND

1. Technical Field

The present disclosure relates to rotation structures and, particularly, to an automatic rotation structure.

2. Description of Related Art

Currently, rotation structures used in cellular phones must be manually rotated by users. This is an inconvenience. Also, repeated operations of rotation may strain the user's fingers.

What is needed, therefore, is a rotation structure which can overcome the above-mentioned problems.

BRIEF DESCRIPTION OF THE FIGURES

Many aspects of the present embodiments can be understood with reference to the figures. The components in the figures are not necessarily drawn to scale, the emphasis instead being placed upon clearly illustrating the principles of the present embodiments. Moreover, in the figures, like reference numerals designate corresponding parts throughout the several views.

DETAILED DESCRIPTION

Figure 1:
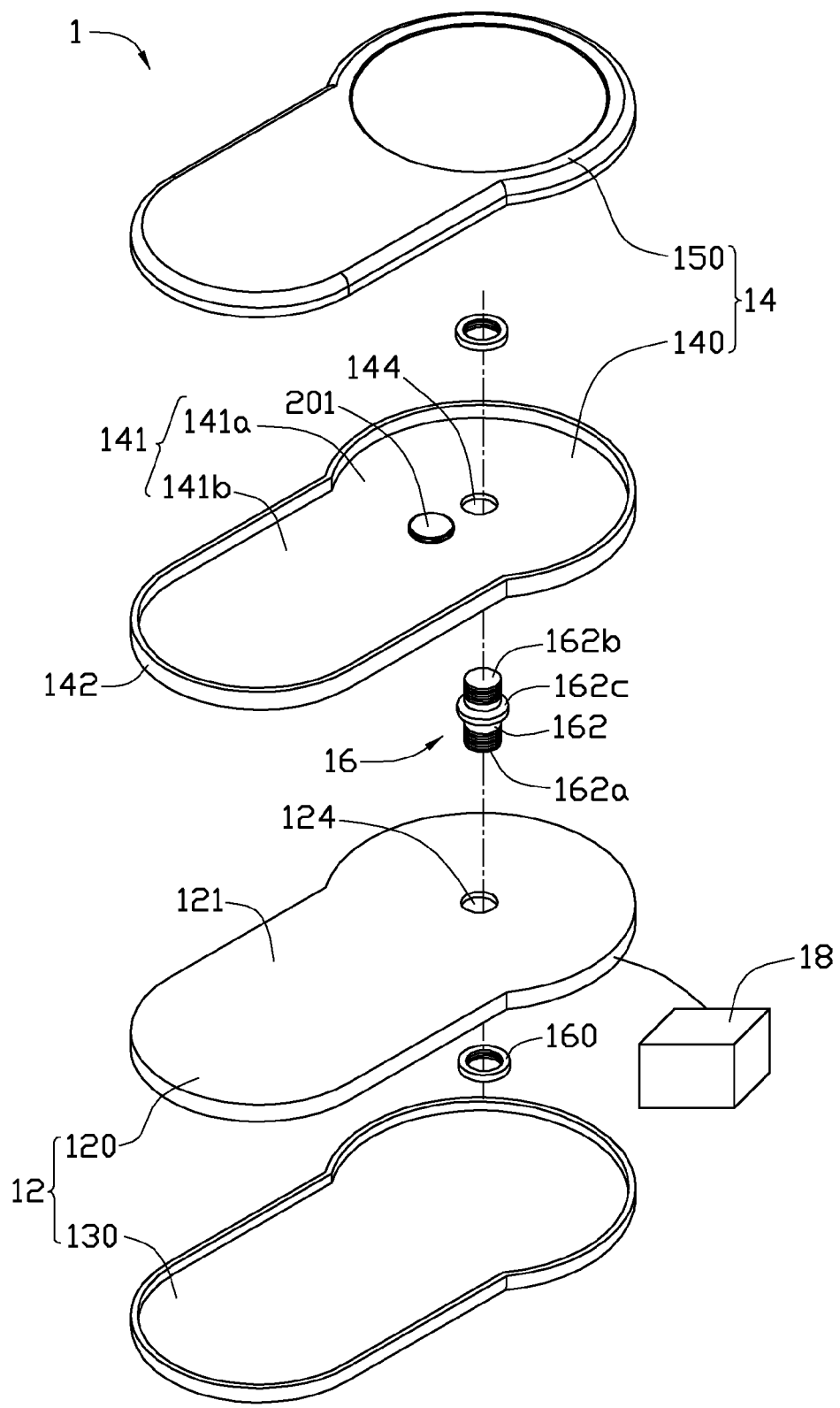
FIG. 1 is an exploded, isometric, schematic view of an exemplary embodiment of a rotation structure.
Figure 2:
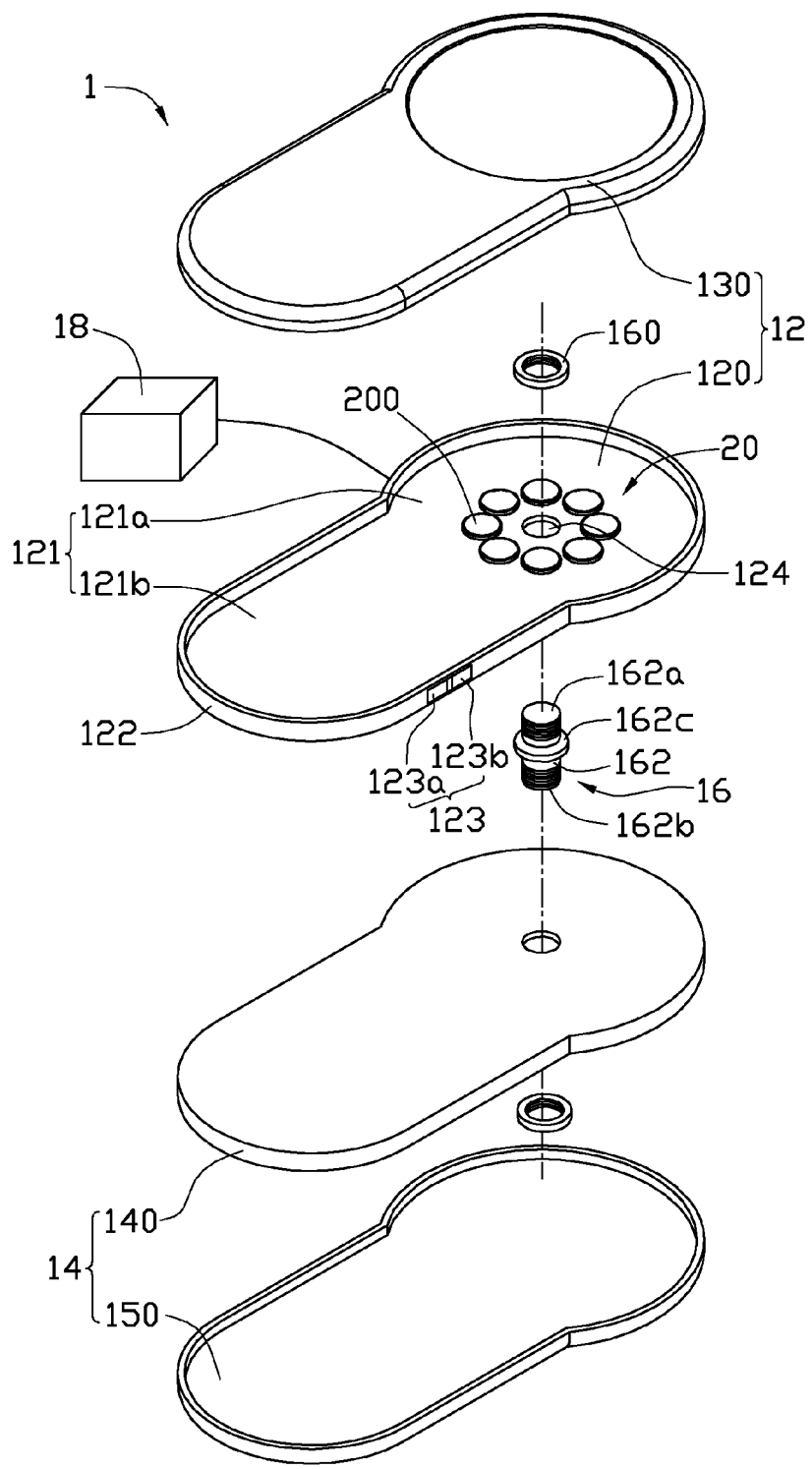
FIG. 2 is an exploded, isometric, schematic view of the rotation structure of FIG. 1, viewed from another angle.

Referring to FIGS. 1-2, a rotation structure 1 includes a first rotatable segment 12, a second rotatable segment 14, a connecting portion 16, a controller 18, and a drive device 20.

The first rotatable segment 12 includes a first base 120 and a first cover 130. The first base 120 includes a first bottom 121, a first sidewall 122, and a button 123. The first bottom 121 is a flat plate and includes a first circular section 121a and a first elliptical section 121b. The first elliptical section 121b extends from the first circular section 121a along the radial direction of the first circular section 121a. A first through hole 124 is defined in the center of the first circular section 121a. The first sidewall 122 perpendicularly extends from the edge of the first bottom 121.

The button 123 is formed on the first sidewall 122 for generating the control instruction of the rotation structure 1. The button 123 includes a first end 123a and a second end 123b. If the first end 123a is pressed, a clockwise rotation instruction is triggered. If the second end 123b is pressed, an anti-clockwise rotation instruction is triggered.

The first cover 130 is substantially the same as the first base 120 in shape for fittingly covering the first base 120. The first cover 130 and the first base 120 corporately define an accommodating space.

The second rotatable segment 14 is substantially similar to the first rotatable segment 12 in shape and includes the counterparts of the first rotatable segment 12. For example, the second segment 14 includes a second base 140 and a second cover 150. The second base 140 includes a second bottom 141 and a second sidewall 142. The second bottom 141 is a flat plate and includes a second circular section 141a and a second elliptical section 141b. A second through hole 144 is defined in the center of the second circular section 141a.

The connecting portion 16 includes a pair of nuts 160 and a screw 162. The screw 162 includes a first threaded end 162a, a second threaded end 162b, and a flange 162c. The flange 162c is a circular plate and interconnects the first threaded end 162a and the second threaded end 162b. The diameter of the flange 162c is greater than that of the first threaded end 162a and the second threaded end 162b. The flange 162c is configured for positioning the connecting portion 16 between the first rotatable segment 12 and the second rotatable segment 14.

The drive device 20 includes a number of electromagnetic elements 200, and a permanent magnet 201. The electromagnetic element 200 can be any electromagnetic element, such as iron wrapped with a coil of wire. The electromagnetic elements 200 can be magnetized by applying a current to the coil of wire. The permanent magnet 201 can be attracted by the magnetized electromagnetic element 200 for providing the force to drive the rotation structure 1.

The controller 18 is configured for controlling the rotated angle of the rotation structure 1 according to the control instruction generated by the button 123.

In assembly, the electromagnetic elements 200 are disposed on the first bottom 121 around the first through hole 124 at a predetermined angle $\theta$. The angle $\theta$ is the smallest angular step of the rotation structure 1. The permanent magnet 201 is fixed on a second bottom 141 of the second rotatable segment 14 and positioned in the effective range of the electromagnetic elements 200.

The first rotatable segment 12 is rotatably connected to the screw 162 by inserting the first threaded end 162a of the screw 162 through the first through hole 124 and tightening the nut 160 on the first threaded end 162a. The second rotatable segment 14 is rotatably connected to the screw 162 by inserting the second threaded end 162b of the screw 162 through the second through hole 144 and tightening the nut 160 on the second threaded end 162b.

The controller 18 is electrically connected to the button 123 and the electromagnetic elements 200.

Figure 3:
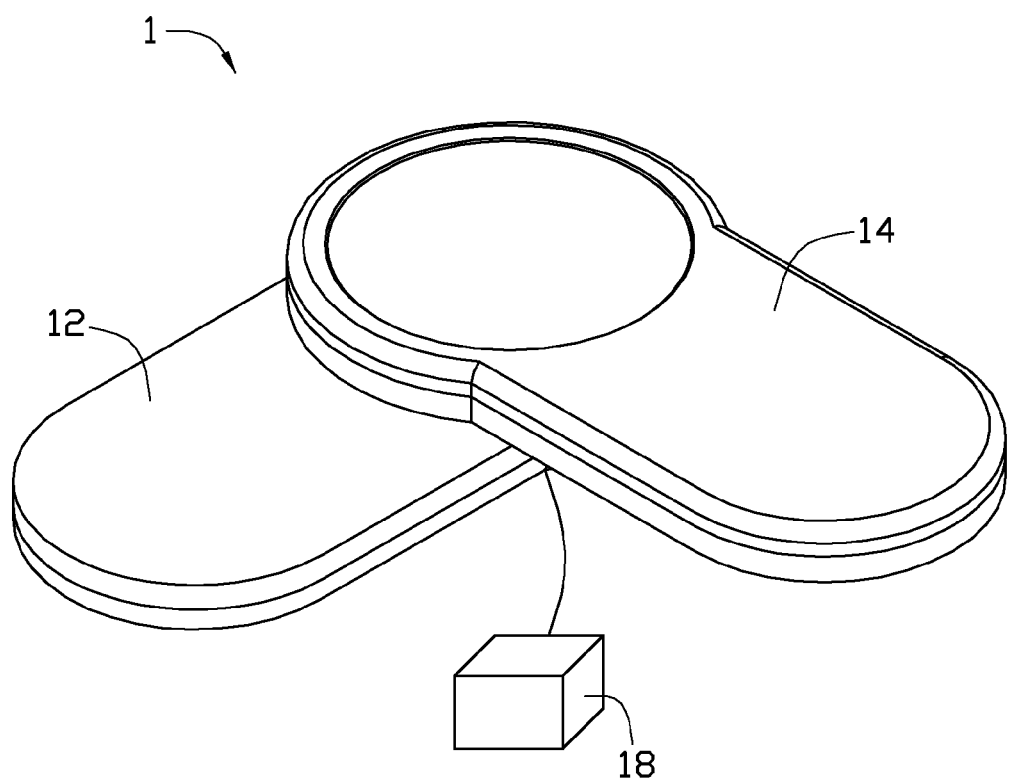
FIG. 3 is an assembled, isometric, schematic view of the rotation structure of FIG. 1.

In use, also referring to FIG. 3, the button 123 is pressed to generate the control instruction. The controller 18 changes the position of the magnetized electromagnetic element 200 at a direction determined by the control instruction. The magnetized electromagnetic element 200 attracts the permanent magnet 201 fixed on the second rotatable segment 14 and drives the second rotatable segment 14 to rotate about the screw 162. Therefore, the second rotatable segment 14 follows the changes of the magnetized electromagnetic element 200 and rotates to different positions.

When the button 123 is no longer pressed, the controller 18 stops changing the position of the magnetized electromagnetic element 200. The second rotatable segment 14 remains at the position where the permanent magnet 201 and the magnetized electromagnetic element 200 are aligned.

It is understood that the speed of the position change of the magnetized electromagnetic element 200 can be preset through the controller 18. Therefore, the second rotatable segment 14 can rotate at different rate according to the preset value.

The rotation structure 1 uses magnetism to drive the second rotatable segment 14 to rotate. The rotation position of the second rotatable segment 14 can be controlled by manipulating the electromagnetic elements 200. Therefore, the rotation structure 1 can work more conveniently.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A rotation structure, comprising:
a first rotatable segment comprising a first base and defining a first through hole in the first base;
a second rotatable segment comprising a second base corresponding to the first base and defining a second through hole in the second base;
a connecting portion comprising a screw; the screw comprising a first threaded end and a second threaded end; the first rotatable segment being rotatably connected to the first threaded end by the first through hole, the second rotatable segment being rotatably connected to the second threaded end by the second through hole;
a drive device comprising a plurality of electromagnetic elements disposed on the first base around the first through hole at a predetermined angle, and a magnet fixed on the second base; and
a controller electrically connected to the electromagnetic elements for selectably magnetizing the electromagnetic elements.

2. The rotation structure of claim 1, wherein each of the first and second base comprises a bottom and a sidewall, the bottom is a flat plate and comprises a circular section and an elliptical section, the elliptical section extends from the circular section along the radial direction of the circular section, the first and second through holes are correspondingly defined in the center of the circular sections of the first and second base, the sidewall perpendicularly extends from the edge of the bottom; the first rotatable segment further comprises a first cover, the first cover is substantially the same as the first base in shape for fittingly covering the first base; the second rotatable segment further comprises a second cover, and the second cover is substantially the same as the second base for fittingly covering the second base.

3. The rotation structure of claim 1, wherein the first rotatable segment further comprises a button formed on the first base, the button comprises a first end and a second end, if the first end is pressed, a clockwise rotation instruction is generated, and if the second end is pressed, an anti-clockwise rotation instruction is generated.

4. The rotation structure of claim 3, wherein the controller is electrically connected to the button and changes the position of the magnetized electromagnetic element at a direction determined by the control instruction.

5. The rotation structure of claim 1, wherein the connecting portion further comprises a pair of nuts, the first rotatable segment is rotatably connected to the screw by inserting the first threaded end through the first through hole and tightening the nut on the first threaded end, and the second rotatable segment is rotatably connected to the screw by inserting the second threaded end through the second through hole and tightening the nut to the second threaded end with the nut.

6. The rotation structure of claim 1, wherein the predetermined angle is the smallest angular step of the rotation structure.

7. The rotation structure of claim 1, wherein the screw further comprises a flange, the flange is a circular plate and interconnects the first threaded end and the second threaded end; the diameter of the flange is greater than that of the first threaded end and the second threaded end; and the flange is configured for positioning the connecting portion between the first threaded end and the second threaded end.

* * * * *

UNITED STATES PATENT AND TRADEMARK OFFICE
CERTIFICATE OF CORRECTION

PATENT NO. : 8,212,440 B2  
APPLICATION NO. : 12/507029  
DATED : July 3, 2012  
INVENTOR(S) : Xiong Li and Kim-Yeung Sip It is certified that error appears in the above-identified patent and that said Letters Patent is hereby corrected as shown below:

Please replace Item (73) regarding "Assignees" on the Title page of the Patent with the following:

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

Signed and Sealed this
Eleventh Day of March, 2014

Michelle K. Lee
*Deputy Director of the United States Patent and Trademark Office*